(12) United States Patent
Lin

(10) Patent No.: US 6,332,940 B1
(45) Date of Patent: Dec. 25, 2001

(54) PROCESS FOR PRODUCING AN INVISIBLE AND WRITABLE BIAXIALLY ORIENTED POLYPROPYLENE (BOPP) RAW PROCESSING FILM AND THE PRODUCT THEREOF

(75) Inventor: Allen Fong-Chin Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/394,349

(22) Filed: Sep. 13, 1999

(51) Int. Cl.[7] .......................... B32B 31/30; B32B 27/32
(52) U.S. Cl. ............. 156/229; 156/244.17; 156/272.6; 264/173.15; 264/290.2; 264/DIG. 73; 264/291
(58) Field of Search .......................... 156/229, 244.11, 156/244.17, 272.6, 275.7; 264/173.15, 290.2, DIG. 73, 291

(56) References Cited

U.S. PATENT DOCUMENTS

| | | | |
|---|---|---|---|
| 4,716,068 | * 12/1987 | Seifried et al. ................... | 428/141 |
| 5,073,452 | * 12/1991 | Satou et al. ........................ | 428/349 |
| 5,552,011 | * 9/1996 | Lin ................................. | 156/244.17 |
| 6,083,443 | * 7/2000 | Eckart et al. ................... | 264/173.14 |
| 6,086,987 | * 7/2000 | Yamanaka et al. ................ | 428/330 |
| 6,136,439 | * 10/2000 | Coburn ............................. | 428/409 |

\* cited by examiner

Primary Examiner—Sam Chuan Yao
(74) Attorney, Agent, or Firm—Bacon & Thomas

(57) ABSTRACT

This invention relates to a process for producing an invisible and writable biaxially oriented polypropylene (BOPP) raw processing film of thickness between 20 to 60 $\mu$m. More particularly, this invention relates to a process for producing a three-layers biaxially oriented PP synthetic raw processing film by means of three-layers co-extrusion, wherein two different PP resin compositions are separately extruded by one primary and two secondary extruders first, and then are co-flowed by a same T-die through cooling molding to form a three layers coating sheet, and through biaxial orientation, corona treatment and winding to form three layers co-extrusion synthetic film of thickness 20–60 $\mu$m. The three layers structure of said three layers co-extrusion synthetic film can be made in the form of invisible and writable layer/intermediate resin layer/backing adhesive resin layer, which can be used in industrial application and stationery application after winding finishing.

1 Claim, 2 Drawing Sheets

PROCESS FOR PRODUCING AN INVISIBLE AND WRITABLE BIAXIALLY ORIENTED POLYPROPYLENE (BOPP) RAW PROCESSING FILM AND THE PRODUCT THEREOF

BACKGROUND

Nowadays, biaxially oriented polypropylene (hereinafter as BOPP) transparent films used as substrate were treated by coating onto its surface to cause the transparent substrate matte, which can be finished by backing adhesive finish to obtain invisible and writable tape. This is the only producing method for the existing invisible and writable tape which is different from the conventional producing method of 3M (Minnesota Mining Manufacturing Company); As a whole, the cost of said conventional producing method is too high, due to an additional coating process and cost of raw material in coating agent and equipment needed, and some loss will occur during the coating process. So the application is limited and cannot be widely used in various usage. Hence the invisible and writable tape made from the raw film by this conventional method will cause abnormality due to the adhesive layer migrating into invisible and writable layer or cause to be unable for adhesion and writing because the invisible and writable layer and adhesive layer may delaminate after a certain period.

SUMMARY OF THE INVENTION

In view of the above description, the present invention is intended to obviate the problems mentioned in last paragraph and to provide a process for producing a three layers invisible and writable biaxially oriented polypropylene (BOPP) film of a thickness between 20 to 60 $\mu$m of the form of invisible and writable layer(11)/intermediate resin layer (12)/backing adhesive resin layer(13)(refer to FIG. 1). The PP composition of PP resin and inorganic ingredients used for invisible and writable layer (11) is extruded by a twin screw secondary extruder with side feeding hopper. While the resin composition used for intermediate resin layer (12) and backing adhesive resin layer (13) are separately extruded by a twin screw primary extruder with side feeding hopper and a twin screw secondary extruder with side feeding hopper. The above-mentioned extrudates are co-flowed by a same T-die to co-extrude and form a three-layers coating sheet, and through cooling, biaxial orientation, corona treatment, and winding to form a three layers co-extrusion BOPP raw processing film of thickness 20–60 $\mu$m, which can be processed after matte finishing in the form of invisible and writable BOPP film.

The invisible and writable BOPP raw processing film obtained according to this invention are different whatever in processing quality and cost with that of conventional prior art, due to the specific process and composition used, and this make more incentives in the market, and can be widely used in the invisible and writable adhesive tape application. The merits can be shown as follows:

1. The invisible and writable layer can be obtained in BOPP process while no after coating treatment needed, it can reduce the production cost for market competence by saving the fee in equipment installation, ingredients, manhour to handle material loss. These are not disclosed in the conventional prior art.

2. The inorganic powder used in the invisible and writable layer obtained by using three layers co-extrusion and biaxial orientation is good in its fixation, the bonding strength between this layer and intermediate layer also better than the bonding strength of coated layer made by conventional prior art and substrate. So the backing adhesive layer may not transfuse into the invisible and writable layer to cause delamination abnormality for a period after coating backing adhesive layer or the invisible and writable layer may not be separated by backing adhesive layer to become useless for writing and adhesion.

3. There is no need of drying zone in the coating process, it favors the heat shrinkage caused by the size reduction and the change of flatness in the film.

4. The invisible and writable layer can be obtained by a twin screw extruder with side feeding hopper, the inorganic powder can be fed into the side feeding hopper in the powder state without pre-forming it into master batch, this can largely reduce the production cost, Further the master batch of inorganic powder blended with resin can also be used in the single screw extruder only if by effectively raising the L/D(length/diameter) of the screw to reach uniform blending effect.

BRIEF DESCRIPTION OF THE DRAWINGS

Referring to the attached drawings, as in FIG. 1 there is shown three layer co-extrusion invisible and writable BOPP processing raw film in this invention;

In FIG. 2, there is shown the processing device of this invention wherein:

(11) represents invisible and writable layer;
(12) represents intermediate resin layer;
(13) represents backing adhesive resin layer;
(21) represents extruder;
(22) represents cooling and shaping roll;
(23) represents longitudinal orientation device;
(24) represents lateral orientation device;
(25) represents corona treatment device;
(26) represents winding device.

For the understanding of technical features of this invention, here provide the description on the aspects including polypropylene resin composition, process (including extrusion, three layers co-extrusion, biaxial orientation, corona treatments, winding) as follows.

Figure 1:
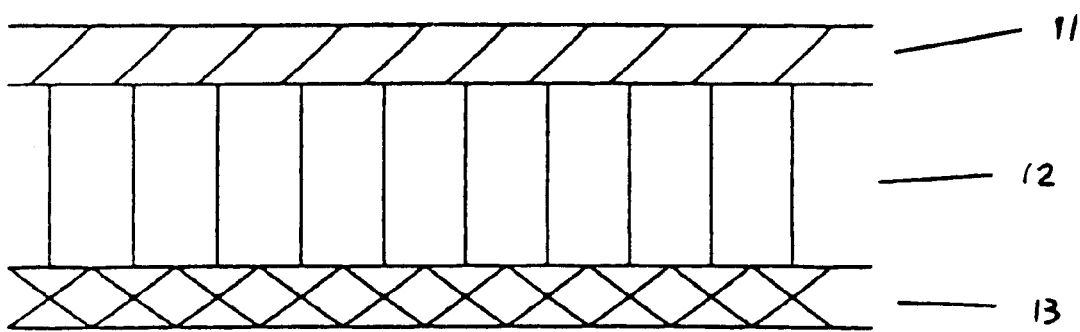

The invisible and writable POPP raw processing film obtained according to this invention for industrial application and stationary, application, having three layers structure, which is constructed by invisible and writable layer/intermediate resin layer/backing adhesive resin layer as shown in FIG. 1. The invisible and writable layer (11) is directly co-extruded into three layers co-extrusion by using a secondary extruder of three extruders, which is different from that of obtained by conventional prior art in the form of the completely transparent BOPP film with coating treatment. It can not only permanently prevent the delamination of invisible and writable layer from backing adhesive layer, but also have superior cost competence in itself. The PP composition used for the invisible and writable layer is extruded by a twin screw secondary extruder with side feeding hopper. The said PP resin composition including the PP resin of 50–90% weight having high crystallinity of isotacticity above 95%, is fed into the side feeding hopper of no. 1 twin screw secondary extruder, while calcium carbonate of 10–50% weight is fed by metering device through side feeding hopper into the secondary extruder, and the mixtures are uniformly blended by the twin screw secondary extruder toward the intermediate runner of T-die; while the resin used for intermediate resin layer (12) and backing adhesive resin layer (13) including the PP resin of 100% weight having high crystallinity above 95% are extruded separately by a twin screw primary and a No.2 secondary extruder, both having side feeding hopper, toward the intermediate runner and outer runner of T-die. The three extrudates extruded by three extruders (one primary and two secondary twin screw extruders) to be co-flowed and extruded through same T-die to form a coating sheet of three layers in the form of invisible and writable layer(11)/intermediate resin layer(12)/backing adhesive resin layer (13), and the said coating sheet is subjecting to biaxial orientation, corona treatment and winding to form a three-layers biaxial oriented PP synthetic raw processing film of thickness 20–60μm for industrial application and stationery application.

The PP resin suitably used in this invention having high crystallinity of isotacticity as the essential ingredient, is homopolymer of melt flow index (MFI) 0.5–8 (230° C./2.16 Kg, ASTM D1238). To control the mechanical strength and quality evenness product, included weight and its distribution of PP resin is preferably selected. Polyethylene (PE) resin can be added in proper proportion to fit the need to improve the invisible binding effect when adhering and improve the invisible and writable layer to attain the combination effect with backing adhere resin layer. The PE resin preferably used is of MFI in the range of 0.1~7.

The inorganic powder used in this invention mainly plays the function for significantly increasing the haze effect with matte finish invisible effect of invisible binding can be produced due to the light refract and reflect.

Furthermore the inorganic powder used in the film can also enhance the writing fluency of ball pen and pencil. The inorganic powder can be one or more than two selected from the group of calcium carbonate, diatomite. kaolin clay, calcium oxide, barium sulfate and titanium oxide, and the particle size of inorganic powder ranges from 0.1 to 10 μm, the used amount depends on the physical properties required. The inorganic powder can be directly fed into the side feeding hopper of the twin screw extruder without the step required in prior arts for acquiring the master batch made from inorganic powder and resin first, and then mixing it with PP resin to be fed in the extruders.

The thickness proportion in the three layers BOPP synthetic raw processing film obtained by this invention can be shown as follows:

| layer | thickness | | |
| --- | --- | --- | --- |
| invisible and writable layer | 20 ~ 30 μm | 30 ~ 40 μm | 40 ~ 60 μm |
| | 1 ~ 5 μm | 5 ~ 7 μm | 7 ~ 9 μm |
| intermediate resin layer | 18 ~ 24 μm | 24 ~ 32 μm | 32 ~ 50 μm |
| backing adhesive resin layer | 1 μm | 1 μm | 1 μm |

Figure 2:
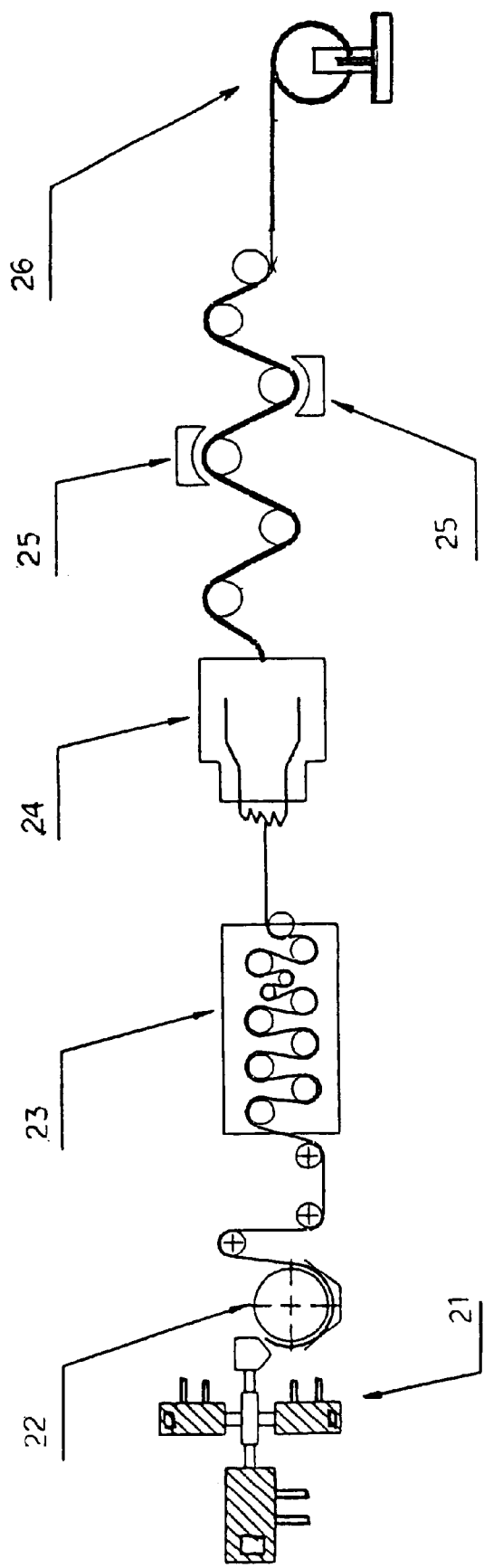

Now, the devices and steps used in producing the three layers BOPP synthetic raw processing film of thickness between 20 to 60μm obtained by this invention will be described in detail with reference to the accompanying FIG. 2.

1. Extruder device(21): comprising a twin screw primary extruder with side feeding hopper and two twin screw secondary extruders with side feeding hopper, whose temperature conditions vary with the ingredients of resin composition, MFI (melt flow index), crystallinity, viscosity, additive and production line speed (winding speed) that normally set in the range between 180° C.~280° C. When the temperature below 180° C. the resin gelation is inferior not easily to extrude through T-die, while the temperature exceed 280° C., the resin is over gelled to cause degradation, and can not be extrude to form sheet product. The three layers structure, which is constructed by invisible and writable layer (11)/intermediate resin layer (12)/backing adhesive resin layer (13) obtained by this invention is achieved with three layers co-extrusion, where the three layers extrudate forms a co-flow at the T-die for three layers co-extrusion through a runner design in the T-die.

2. Cooling and shaping roller device(22): adopting the water cooling or air cooling device to cool and form the three layers co-extrudate of high temperature between 180° C. and 280° C. The control of cooling temperature in this process is quite important, which promises the success of the steps of following process. The cooling temperature is normally set at 15 –60° C. being adjustable depending on the thickness of synthetic paper and the speed of production line.

3. Longitudinal orientation device(23): The cooled and formed sheet is fed in this device for preheating to soften the paper sheet at 115–150° C. (depending on the thickness of required paper sheet and the speed of production line), and then be oriented in two steps with low and high speed so as to enhance the longitudinal mechanical strength of coating layer which being then tempered and formed. In general, the longitudinal draw ratio is set at 3~6 times.

4. Lateral orientation device (24): The thinner paper sheet formed through the foregoing longitudinal orientation treatment is preheated and softened at 140~195° C. (depending on the thickness of paper sheet and the speed of production line)and then laterally oriented and finally tempered and formed so as to partially reduce the dimension of coating layer for its stability. Generally, the lateral drawing ration is set at 5~12 times depending on the required feature of product.

5. Corona treatment (25): This treatment is to improve the surface tension of backing adhesive resin layer of raw processing film of invisible and writable tape, to fit the requirement of adhesive tape processing factory. Corona treatment can be carried out by using a device of high frequency discharging with a power of 20~120 KW (depending the speed of production line) so as to obtain a surface wetting tension of 36~48 dyne/cm$^2$.

6. Winding device (26): The raw processing film of invisible and writable tape obtained by the above-described steps is taken up to be a end product with 8 M (meters) width by a tubular device, and then can be striped into thickness of 25–60 μm, packaged into rolled product.

DESCRIPTION OF PREFERRED EMBODIMENT

The technical feature of this invention i.e., how PP resin system can be used to form invisible and writable tape for industrial application and stationery application by using biaxial orientation process, will be more readily apparent from the following detailed description of preferred embodiments of the invention taken in conjunction with the accompanying drawings.

Example (raw processing film of invisible and writable tape in thickness of 32 μm)

PP resin (MFI=2.0) of 75% weight and calcium carbonate of 25% weight were separately fed into the side feeding hopper of No. 1 twin screw secondary extruder (21), wherein calcium carbonate was metered by metering device first; PP resin (MFI=2.0) of 100% weight were separately fed into the side feeding hopper of one twin screw primary extruder and a no.2 twin screw secondary extruder(21). At the extruder temperature of 200–280° C., extrudates are extruded from one primary extruder and two secondary extruders through the same T-die by means of three layers co-extrusion to form PP coating sheet.

At the temperature 15~60° C. of cooling and shaping roller (22), the melted PP coating sheet of three layers co-extrusion is cooled and shaped, the shaped sheet then entered into longitudinal orientation device(23) which is preheated to temperature set at 120~150° C., elongated times for longitudinal orientation, then tempered and cooled. The shaped sheet then entered into lateral orientation device (24) which is preheated to temperature set at 150~185° C. for drawing, 9 times for lateral orientation, then tempered and cooled to control the shrinkage ratio of the final product. After this step, the three layers co-extrusion coating sheet subjected to corona treatment (25) for better adhesive spreading, finally taken up by winding device(26). The physical properties of the invisible and writable tape of thickness 32 μm for industrial application and stationary application thus obtained according to the above steps in this embodiment is shown as following table.

| Test item | | Test value | Test method |
|---|---|---|---|
| Thickness (μm) | | 32.8 | TAPPI T-411 |
| Surface wetting tension (dyne/cm) | | 32.8 | Conventional Method |
| Breaking strength | MD | 11.6 | ASTM D882 |
| (kgf) | CM | 20.9 | |
| Tensile strength | MD | 13.8 | ASTM D882 |
| (kg/mm$^2$) | CM | 25.7 | |
| Elongation rate | MD | 135.2 | ASTM D882 |
| (%) | CM | 55.8 | |
| Heat shrinkage | MD | 1.88 | Conventional Method |
| (%) | CM | 0.15 | |
| Specific gravity | | 0.87 | ASTM D1248 |
| Haze (%) | | 16.6 | TAPPI T-425 |
| Roughness (μm) | | 1.30 | TAPPI T-555 |
| Delamination peeling property | | no peeling | Conventional Method |
| Writing fluency (pencil, ball pen) | | good | Conventional Method |
| Break in writing (pencil, ball pen) | | none | Conventional Method |

What is claimed is:

1. A process for producing an invisible and writable biaxially oriented polypropylene raw processing film have a thickness of 20–60 μm which comprises:

(a) Separately feeding a first resin composition comprising 50%–90% by weight of a high crystallinity polypropylene having over 95% isotacticity, and 10%–50% by weight of calcium carbonate powder into a side hopper of a first twin screw secondary extruder;

(b) feeding a second resin composition comprising 100% by weight of high crystallinity polypropylene having over 95% isotacticity into a side feeding hopper of a twin screw primary reactor;

(c) feeding a third resin composition comprising 100% by weight of high crystallinity polypropylene having over 95% isotacticity into a side feeding hopper of a second twin screw secondary extruder;

(d) conveying said first, second and third resin compositions through said first twin screw secondary extruder, said twin screw primary extruder and said second twin screw secondary extruder respectively to a T-die and co-extruding said first, second and third resin compositions through said T-die at an extrusion temperature of 180° C. to 280° C. to form a three layer polypropylene raw processing film having an invisible and writable layer formed from said first resin composition, an intermediate resin layer formed from said second resin composition and a backing adhesive layer formed from said third resin composition;

(e) cooling and shaping said three layer polypropylene raw processing film by contacting said film with a cooling roller having a temperature of 15° C.–60° C. to form a cooled and shaped polypropylene raw processing film;

(f) orienting said cooled and shaped polypropylene raw processing film longitudinally 3–6 times in a preheated longitudinal orientation device; said preheated longitudinal orientation device being preheated 115° C. to 150° C.; and then tempering and cooling said film;

(g) orienting said cooled and shaped polypropylene raw processing film laterally 5–12 times in a preheated lateral orientation device; said preheated lateral orientation device being preheated to a temperature of 140° C.–195° C.; and then tempering and cooling said film, whereby said longitudinal and lateral orientation of said film produces a biaxially oriented polypropylene raw processing film;

(h) treating said biaxially oriented polypropylene raw processing film to a corona discharge treatment with a high frequency wave under a power of 20–120 KW; and (i) taking up said biaxially oriented propylene raw processing film by a winding device to form a roll of said invisible and writable biaxially oriented polypropylene raw processing film having a thickness of 20–60 μm.

* * * * *